Patented Oct. 31, 1950

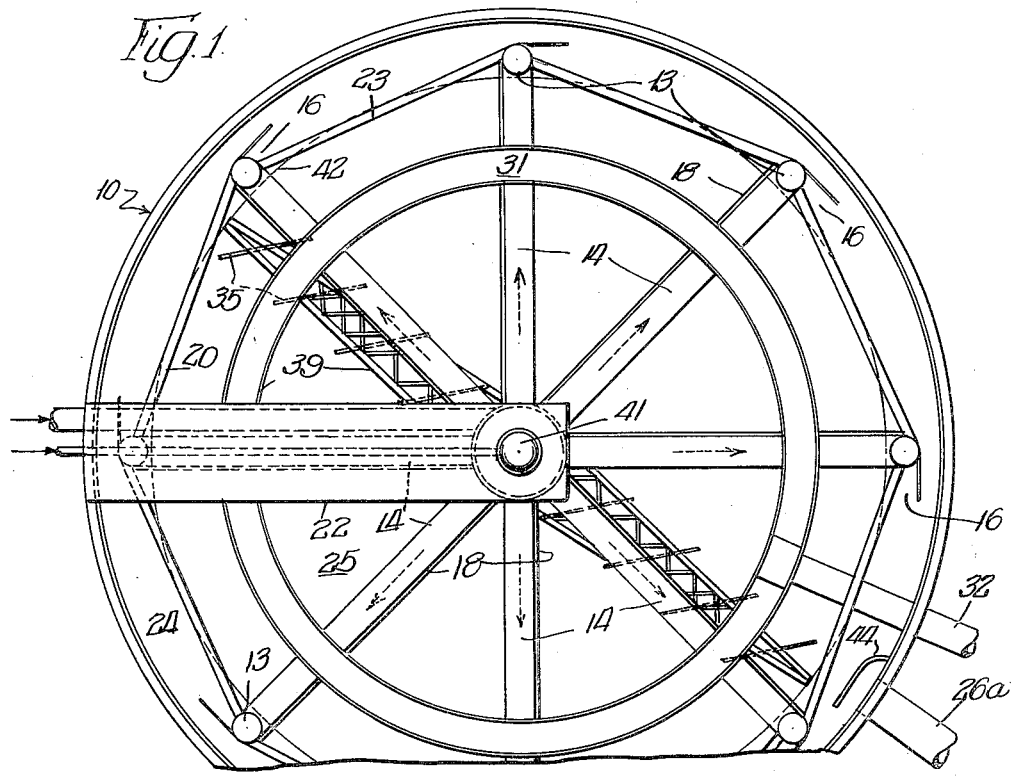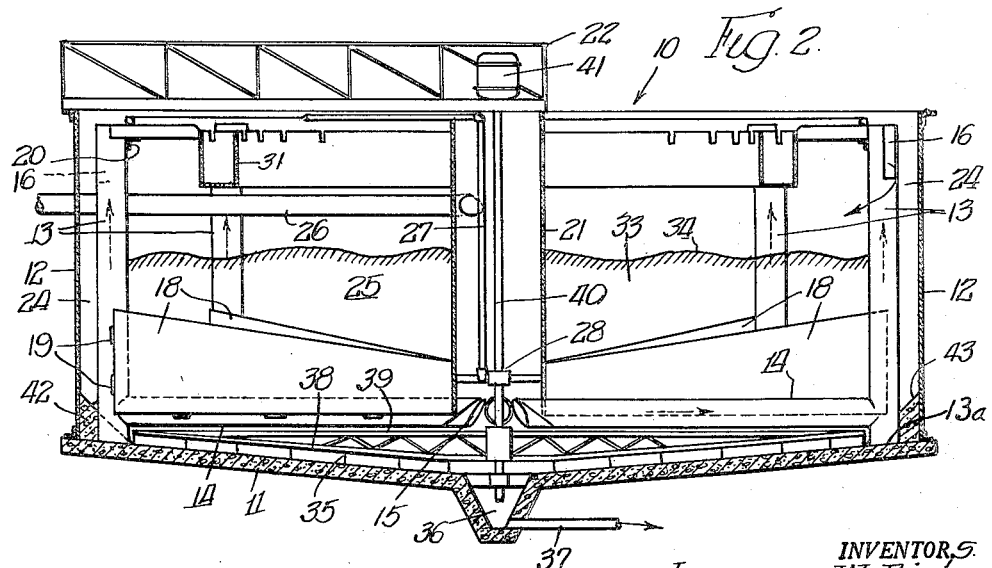

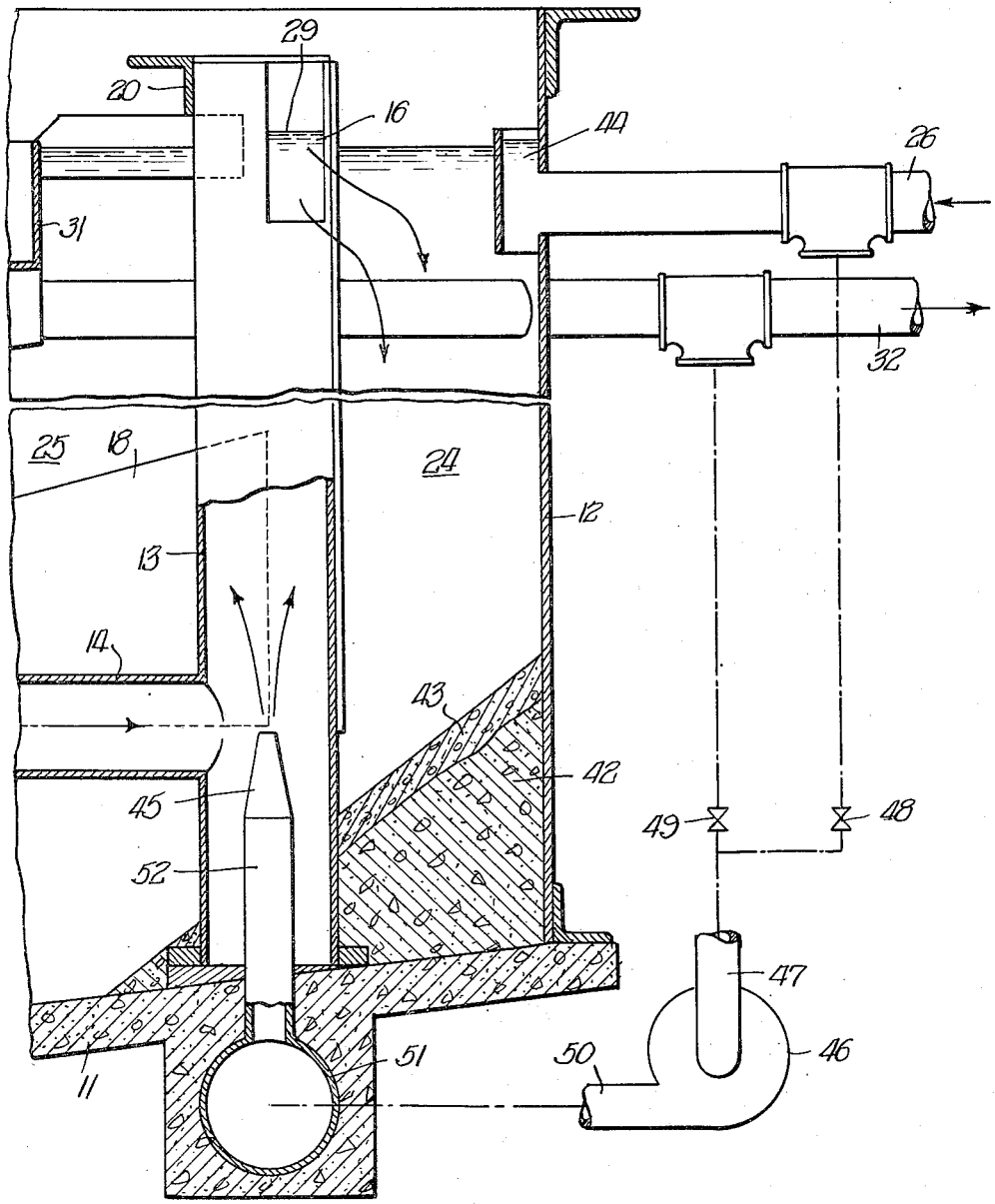

2,527,788

UNITED STATES PATENT OFFICE 2,527,788

SLUDGE BLANKET CLARIFIER WITH OUTWARD AND UPWARD RECIRCULATION OF SLUDGE

Lawrence W. Bieker, Munster, Ind., and Frank D. Prager, Chicago, Ill., assignors to Graver Tank & Mfg. Co., a corporation of Delaware Application August 8, 1946, Serial No. 689,138

10 Claims. (Cl. 210—16)

This invention relates to liquid treatment, and particularly to a sludge blanket clarifier for the removal of turbidity, hardness, iron, silica and the like, from water and similar liquids.

A primary object of our invention is to build a sludge blanket clarifier of medium or large size with minimum cost.

A further object is, to make such a sludge blanket clarifier more efficient.

More specific objects, and particular advantages of our invention relate to the fluid distributing members, which are required for an efficient sludge blanket clarifier of medium or large size. In such a clarifier, a sludge blanket is retained and suspended, in a sludge filtration and clarification chamber, for contact with the liquid to be treated. For this purpose liquid is circulated, preferably in an inward direction over the bottom of the sludge filtration chamber, with outward return to peripheral parts of the tank. Heretofore, return flows were passed through radial distributing pipes, which were either installed in the top of the clarification chamber, or buried below the surface of the tank bottom. Such distributing pipes, installed in the sludge filtration and clarification chamber, obstruct the necessary upward flow of the liquid to a certain extent. Our invention provides such obstruction in a zone where it is much more desirable than where it was heretofore provided. Furthermore, we simplify the construction. The recirculating liquid, heretofore, was brought to the distributing pipes by a central standpipe or flow collector, and it was a costly matter to insure the necessary fit between the distributing pipes and the central standpipe or collector. Our invention provides distributing pipes freely ending in a lower, central part of the tank. Thus we secure the necessary fluid recirculation and distribution without said fit-up problems.

Other special objects and advantages of our invention relate to the necessary partition between the flocculating chamber or channel wherein the sludge blanket material is formed, and the sludge filtration and clarification chamber wherein it is utilized. These chambers are well known by themselves. As in prior tanks, they are concentrically arranged, with the flocculation channel or chamber surrounding the clarification chamber. As usual, we install an annular partition between the two chambers. Heretofore such a partition generally was formed by a cylindrical or conical wall extending from the top of the tank downwards to above the bottom of the tank. Such an annular partition is too large and heavy to be conveniently suspended from the usual superstructure of the tank. Theoretically, it can be supported from the side wall of the tank; but structural support members extending from the side wall, through the flocculation channel, are likely to act as baffles, while in many instances it is desirable to maintain a liquid rotation or spiralling flow throughout this channel. Furthermore, the steel plates which are often used for such a partition require some appreciable expense for rolling the plates, and sometimes for preparing the plate edges for welding. In our tank, the partition is preferably formed by flat plates. Such plates are conveniently supported by the distributing pipes, thereby eliminating all difficulties with supports extending from the side wall of the tank. Further, this manner of supporting the partition enables us to provide a flocculation channel of particularly efficient form for the purpose of maintaining a suitable spiral flow.

Still other objects relate to details such as the means to recirculate liquid in order to maintain a sludge blanket; to instrumentalities for the reestablishment of a sludge blanket after a temporary shut-down; and related matters.

These, as well as other objects and advantages will be more clearly understood upon consideration of the following detailed disclosure. In the drawing:

Fig. 1 is a plan view of a sludge blanket clarifier designed in accordance with this invention.

Fig. 2 is a central, vertical section through the apparatus of Fig. 1.

Fig. 4 is a view similar to Fig. 3 but showing a modified embodiment.

Figure 3:
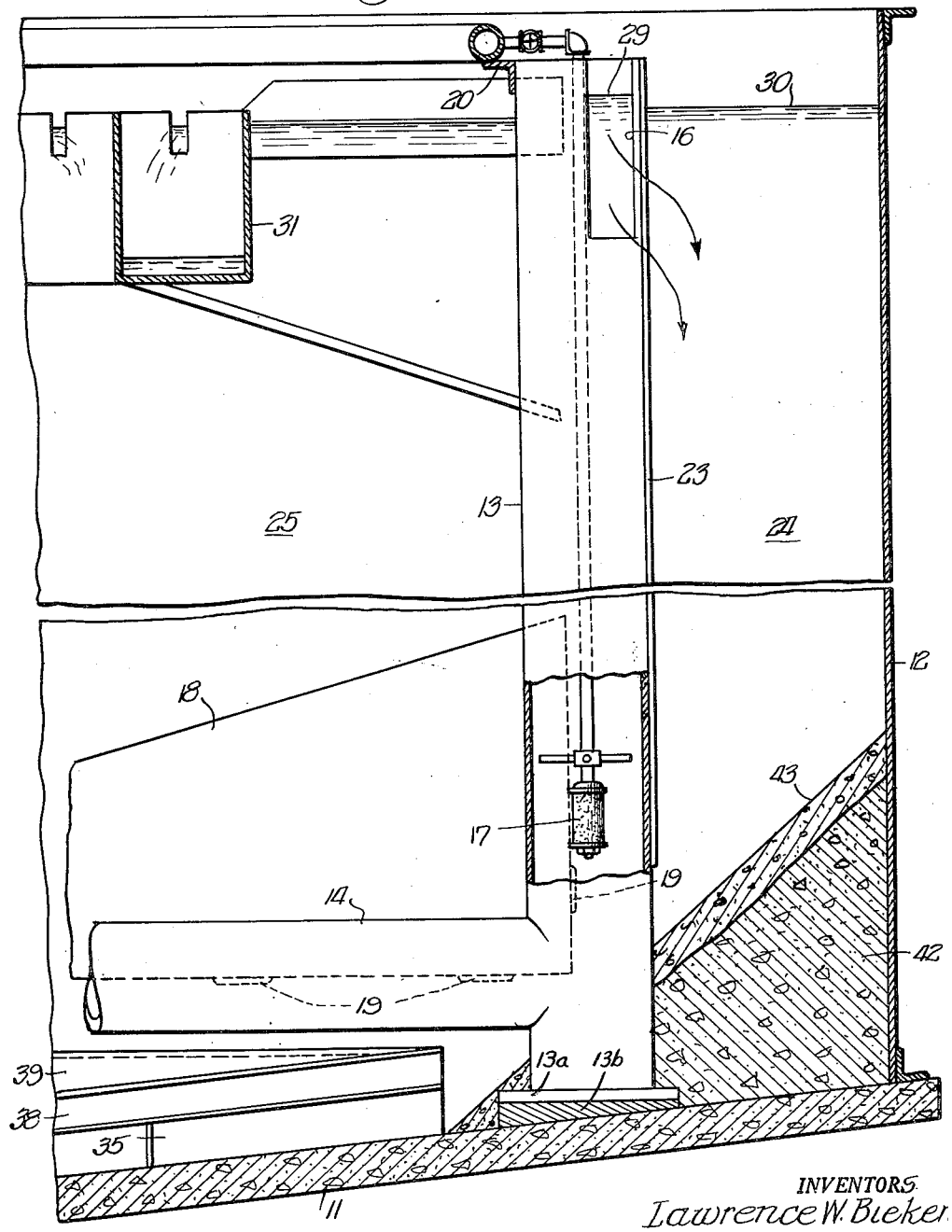
Fig. 3 is a vertical section, on an enlarged scale, of a slightly modified detail from Fig. 2.

Referring first to Figs. 1, 2 and 3: the tank 10 has a substantially flat bottom 11, which of course may be slightly inclined. The tank is confined by a cylindrical side wall 12 upstanding from the peripheral part of the bottom. The tank is open at the top.

A plurality of vertical steel pipes 13 are installed in the tank, upwardly extending from adjacent the bottom 11 and inwardly spaced from the wall 12. As shown in Figure 2 each pipe 13 is supported by a blind end or foot 13—A, resting directly on the bottom 11. As shown in Figure 3 a pad 13—B may be inserted below such supporting end 13—A. Members 13 form an annular series of pipes, concentric with the tank, and are uniformly spaced from one another. They are open at the top. The lower end of each pipe 13 is disposed a certain distance above, but relatively adjacent to the bottom, and is connected to an inwardly extending steel pipe 14, and these latter pipes are shown as radially and horizontally disposed. They end freely in a lower central part of the tank. Adjacent the free, inner end of each horizontal pipe 14, we provide a suction opening 15, facing downwards; and adjacent the upper end of each vertical pipe 13, we provide a discharge opening 16, facing laterally. Liquid recirculation is achieved by means of airlift members 17, that is, discharge members for compressed air, installed in the vertical pipes 13 below the top of the tank but slightly above the intersection between the horizontal and vertical pipes.

The vertical pipes 13 support the horizontal pipes 14 by vertical steel gusset and baffle plates 18, preferably secured to the sides of both pipes by suitable tack welds 19. The vertical and horizontal pipes form pipe assemblies 13, 14, reinforced by said gusset plates. In order to prevent these pipe assemblies 13, 14 from falling over inwards, we may hold them by means such as an annular girder 20 interconnecting the several vertical pipes 13 adjacent their top portions. In this manner, a rigid structure is formed by the series of distributing pipe assemblies 13, 14.

In some instances we may support a central open-ended cylinder or other structure 21 upon the inner ends of the horizontal distributing pipes 14 and gusset plates 18; said cylinder extending to adjacent the top of the tank for the purpose of aiding towards the support of a superstructure 22 above the tank.

The vertical pipes 13 support flat, vertical steel plates 23 which are arranged in annular succession so as to form a partition between an outer annular flocculation chamber or channel 24, and an inner sludge filtration and clarification chamber 25 within the tank. The plates or partition members 23 extend from adjacent the top of the tank downwards to above, but somewhat adjacent the bottom 11; they terminate at the joints between the vertical and horizontal pipes 13, 14. Thus they leave an annular slot or opening between the channel 24 and the chamber 25. Each of these vertical plates or partition members 23 extends from one of the vertical distributing pipes 13 to the next adjacent one, and is welded to the outsides of these vertical distributing pipes. In the present embodiment, each of the vertical partition plates has one upright or vertical edge welded to a vertical strip or portion of the outside of a vertical distributing pipe 13 which faces the side wall 12, and has has the other upright or vertical edge welded to a vertical strip or portion of the outside of the next adjoining vertical distributing pipe 13 which is at least somewhat remote from the side wall 12. In this manner the series of vertical partition plates 23 form a succession of members interconnecting angularly spaced surface portions of adjoining vertical distributing pipes 13. The inwardly facing portions of the vertical distributing pipes 13 cooperate with the plates 23 to form the annular partition between the channel 24 and the chamber 25. This partition 23, 13, as seen from the top, has some similarity with a large circular saw. In other words, the flocculating channel 24 has a substantially smooth or cylindrical outer boundary wall 12, but a jagged inner boundary wall 23, 13.

The laterally facing discharge openings 16 of all distribution pipes are located on portions of said pipes which are disposed in the same direction with respect to the annular channel 24, so that the discharge of liquid through said openings results in a uniformly spiralling flow in the flocculation channel.

In operation, we introduce the raw liquid to be treated into the central cylinder 21 by an inlet pipe 26, which may be equipped with suitable control means (not shown). Required chemical reagents are introduced by a pipe 27 extending downwardly through the central cylinder 21 to a distributor 28 adjacent the suction openings 15.

Continuous operation of the airlift members 17 results in the formation of a mixture of liquid and air in each of the vertical distributing pipes 13. Such a mixture, being lighter than the liquid itself, rises to a liquid level 29 in each vertical distributing pipe which is higher than the general liquid level 30 in the tank. This again causes liquid to flow from each vertical distributing pipe through the discharge opening 16 into the channel 24; and equivalent amounts of liquid are drawn into the suction inlet 15 of each horizontal distributing pipe 14 in the central, lower part of the sludge filtration chamber 25. The necessary hydraulic balance is continuously and automatically reestablished in the tank by a flow which passes spirally and downwardly through the flocculation channel 24, and inwardly and spirally over the bottom 11. Thus we have a system of circulating flows comprising a unitary spiralling flow within the flocculation channel 24 and over the bottom 11, and a series of return flows which pass from the lower central portion of the tank, radially outward in the horizontal pipes 14, then upward in the vertical pipes 13, and finally back into the unitary spirally flow through the discharge openings 16.

This system of circulating flows is established and maintained by the airlift devices 17, regardless of any incoming flow from the inlet 26. If and when there is such an incoming flow, the bulk of the liquid thereof joins the return flows and then the unitary spiralling flow. Amounts of liquid, equivalent to the incoming flow, are upwardly displaced from the inward, spiral flow over the tank bottom, between and then above the horizontal pipes 14, through the sludge filtration and clarification chamber 25, to an overflow launder 31 at the top of said chamber, which discharges to a point of use or storage by a pipe 32.

For certain typical applications of our tank, the distributing pipes are so dimensioned and the air lift members so operated that large quantities of liquid, such as about five times the maximum input flow at 26, constantly recirculate through these pipes, at a velocity such as about 1 or 1.5 feet per second, with a head differential between the liquid levels 29 and 30 such as about an inch or a few fractions of an inch; the channel 24 and chamber 25 in turn being so dimensioned that the resulting flows have suitable flocculating and sludge filtration velocities, such as a few inches per second in the channel and a few inches per minute in the chamber.

The chemicals centrally introduced by the pipe 27 are immediately exposed to the most rapid flow conditions prevailing within the tank, whereby they are finely dispersed throughout the liquid recirculating in the distributing pipes, and subsequently in the flocculation channel. As these finely dispersed chemicals come into contact with incoming raw liquid from the pipe 26, the well-known reactions of floc-formation begin to take effect. Flocs are formed and built up in the water spiralling through the flocculation channel and also in the flow over the bottom of the sludge filtration chamber. Such flocs are rapidly recirculated, with some break-up thereof, through the distributing pipes into the flocculation channel, where they are built up again. As a result, previously formed, suspended flocs are accumulated in this channel and also in the lower part of the sludge filtration chamber, where they form a sludge blanket 33. Since these suspended flocs are heavier than the liquid itself, the sludge blanket remains in the lower part of the tank, and extends upward only to a limit or surface 34. It is necessary and generally possible, although it always is a delicate operation, to maintain this sludge blanket surface 34 in sufficiently well defined manner, at a level high enough to provide substantial sludge filtration, but safely below the overflow launder 31.

The aforementioned velocities of the spiral flow over the bottom 11 have an effect upon the elevation of this sludge blanket surface 34, which is also affected by the baffle plates 18. The elevation of the sludge blanket surface 34 is further dependent on the rate of the throughput flow rising through the sludge filtration chamber 25. Whenever this rising rate reaches a certain capacity limit, the upward expansion of the sludge blanket is at a maximum.

It is here where one of the advantages of our tank design comes into action. A great variety of liquid flow velocities are required in tanks of this type. The lowest flow velocities are desirable within the clarification zone, including the upper part thereof, where sometimes a remainder of very fine and poorly settleable flocs or other solids are present. In the past, it often was considered that no particular liquid treatment takes place above the sludge blanket 33. Actually, we have often observed a haze of fine flocs, or the like, above the blanket, even in cases where the surface of the blanket was well defined. The concentration of solids may change abruptly from thousands of parts per million to just a few parts per million, at the sludge blanket level, but we may still have flocs suspended in the liquid above; and these flocs often are stratified from about 100 parts per million immediately above the blanket to less than 10 at the top of the tank. It has occurred to us that it is basically necessary to apply sludge filtration in the blanket, but plain upflow sedimentation in the clarification zone above the blanket. The effect and utility of the suspended sludge blanket is connected with a continuing flocculating activity going on within this sludge blanket, which is promoted by some slight and gentle agitation of the sludge blanket material. The distributing pipes, when so dimensioned as to provide the aforementioned recirculating quantities and velocities, generally occupy quite a few per cent of the area of the sludge filtration chamber, thereby obstructing the upward flow materially. Our new arrangement provides such obstruction in said lower part, where it aids the continuing flocculating activity. We avoid such obstruction in the top part of the clarification chamber, where it would disturb the desired, plain clarification.

These improved flow conditions are secured with very simple means, substantially consisting of the distributing pipe assemblies 13, 14. While the horizontal pipes 14 should extend inwardly in a substantially radial direction, they may deviate from such direction by as much as a few inches adjacent the center of the tank, with no operating difficulties resulting. This is due to the fact that the pipes end freely, and draw fluid material directly from the lower, central portion of the sludge filtration chamber. In other words, we eliminate the need for any fitup between the inner ends of such pipes and a central standpipe or collector member such as used in prior designs. Thus we have a simplified and more economical structure, resulting in greater efficiency.

Our distributing pipe assemblies 13, 14 provide additional advantages, as to the partition 23. The vertical pipes 13 serve as most convenient and economical supports for this partition, eliminating an expensive superstructure as well as an objectionable side support. The partition is further simplified, and the cost for it reduced. By the use of flat plates as mentioned, the labor of rolling these plates to a certain diameter is avoided. Finally the fitting up of the partition members is greatly simplified by the alternate use of plates and pipes for the partition; any slight irregularities in plate dimensions are easily compensated by slightly varying the location of the weld seams.

At the same time, we provide functional improvements as to the flocculation channel 24, by this simple and inexpensive partition structure. The more or less saw-shaped form of the inner boundary wall for this channel provides a most convenient means to secure gentle agitation of the spiralling liquid, by successive expansions and contractions. It also facilitates the injection of circulating liquid so as to generate this spiral flow.

As the liquid is treated in our clarifier, floc particles in the sludge blanket gradually reach such a size or weight that they sink through the rising and spiralling flows, and settle as a sludge sediment upon the bottom 11. Conventional sludge scrapers or ploughs 35 are caused to rotate slowly over this bottom and through the sludge sediment, in order to dewater the sludge and to collect it in a central sludge sump 36 from which it is withdrawn by the usual sludge outlet pipe 37. The scrapers 35 are attached to rigid scraper arms 38 forming part of a scraper truss 39 which is secured to a central vertical shaft 40, driven by the usual motor reducer 41 on the super-structure 22.

Of course the rigid scraper arms 38 cannot extend outwardly beyond the supports 13—A for the vertical distributing pipes 13, but are limited to the sludge filtration chamber as shown. Nevertheless some large and heavy sludge particles may settle in the flocculation channel 24, in the operation of the tank and mainly upon any shutdown. In order to avoid difficulties due to such sedimentation in the channel, we provide an annular cornerfill 42 in the bottom part of the channel 24, generally formed by a mass of suitable material such as slag or the like, with a concrete cover above it. This cornerfill exposes an inclined wall 43 to the inside of the tank, which slopes from the side wall 12 downward to a portion of the bottom 11 just inside the ring of supports 13—A for the vertical distributing pipes 13. Any sludge settling in the channel slides down this cornerfill, and is finally collected by the sludge scrapers 35.

In some forms of operation, especially in tanks of medium size, which often are deep rather than wide, we may inject the raw liquid directly into the top of the annular flocculation channel 24, instead of feeding it centrally to the zone of the suction inlets 15 of the horizontal distributing pipes 14. Accordingly we may provide an additional inlet pipe 26—A with a discharge nozzle 44 in the channel 24, facing in the same direction as the discharge openings 16 of the vertical distributing pipes 13. Either pipe 26 or 26—A is used, by means of suitable valves (not shown). In some cases, the central cylinder 21 can be omitted, together with the centrally discharging inlet pipe 26.

In the embodiment of Fig. 4 we introduce raw liquid, or sometimes treated liquid, or chemicals, into the distributing pipes 13, 14; and eliminate the air lift means 17. This modification is useful in cases where airlifts are inefficient due to corrosion problems or the like. Instead of creating a suction in the horizontal pipes by introducing jets of air, into the vertical pipes, we create it here by introducing jets of liquid into the vertical pipes; for instance, jets formed of parts of the liquid to be treated, or of the treated liquid. Each liquid jet is formed in and by a nozzle 45, upwardly discharging into the vertical pipe adjacent the juncture with the horizontal pipe, so as to draw additional liquid through the horizontal pipe. Relatively small quantities of liquid are required for such jets; additional quantities of raw liquid may be introduced into the tank, either through a central inlet 21, or through a peripheral inlet 44. In order to provide the necessary suction by these jets, and also to distribute the liquid evenly over a plurality of such nozzles 45, we generally dimension these nozzles so as to cause an appreciable loss of head in each nozzle. Accordingly the liquid head has to be boosted by a pump 46, prior to injection into the nozzles. The suction inlet 47 of such a pump may be connected to the inlet 26 for raw liquid, through a valve 48, or to the outlet 32 for treated liquid, through a valve 49. The discharge outlet 50 of the pump may be connected to a ring-shaped pipe 51 buried below the surface of the tank bottom 11, and from which individual pipes 52 are branched off, leading to the nozzles 45.

Still other modifications are likely to occur to persons skilled in this art. We claim:

1. A liquid treatment tank of the sludge blanket clarifier type, comprising a substantially flat, circular bottom; a side wall upstanding from a peripheral part of said bottom; an annular partition wall within and concentric with the tank, extending from adjacent the top of the tank downwards to above said bottom, and defining an outer flocculation channel and an inner sludge filtration and clarification chamber; a plurality of pipes upwardly extending from adjacent said bottom, supporting one of said walls, uniformly spaced from one another, and forming an annular series of pipes, concentric with the tank; a further pipe connected to each of said upwardly extending pipes, between said bottom and the top of the tank, inwardly extending into and freely ending in a central, lower part of the tank, and forming a pipe assembly with the respective upstanding pipe; means to reenforce said pipe assemblies and to hold them together as a rigid structure; each of said inwardly extending pipes having an inlet opening in said central, lower part of the tank, and each of said upwardly extending pipes having a discharge opening in an upper part of said channel; fluid jet means in each of said pipe assemblies to establish a liquid flow from said central, lower part of the tank into the respective inlet opening, through the pipe assembly, from the respective discharge opening, downwardly through said channel, and inwardly over said bottom; means to add liquid to be treated and any required chemical reagents to such flow, and means to withdraw treated liquid from the top of said chamber, whereby there can be established a flow through said chamber, rising from said inward flow, between and then above said inwardly extending pipes; sludge outlet means in said bottom, within said chamber; sludge scraper means in said chamber, below said inwardly extending pipes, to scrape settled sludge to said sludge outlet means; and means to rotate said sludge scraper means.

2. A tank according to claim 1, wherein each of said fluid jet means comprises a discharge member for compressed air, installed in the respective upwardly extending pipe above the point where the pipe joins the respective inwardly extending pipe, but below the top of the tank.

3. A tank according to claim 1, wherein each of said fluid jet means comprises a liquid discharge nozzle installed in the respective upwardly extending pipe, adjacent and slightly below the point where the centerline of the pipe crosses that of the respective inwardly extending pipe.

4. A tank according to claim 1, wherein at least some of said pipes upwardly extending from adjacent said bottom support said partition wall.

5. A liquid treatment tank of the sludge blanket clarifier type, comprising a substantially flat, circular bottom; a side wall upstanding from a peripheral part of said bottom; an annular series of pipes, concentric with the tank, upwardly extending from adjacent said bottom, inwardly spaced from said wall, and uniformly spaced from one another; a further pipe connected to each of said upwardly extending pipes, between said bottom and the top of the tank, inwardly extending into and freely ending in a central, lower part of the tank, and forming a pipe assembly with the respective upwardly extending pipe; means to reinforce said pipe assemblies and to hold them together as a rigid structure; substantially vertical partition means secured to said upwardly extending pipes, extending from adjacent the top of the tank downwards to above said bottom, and defining an outer flocculation channel and an inner sludge filtration and clarification chamber; each of said inwardly extending pipes having an inlet opening in said central, lower part of the tank, and each of said upwardly extending pipes having a discharge opening in an upper part of said channel; fluid jet means in each of said pipe assemblies to establish a liquid flow from said central, lower part of the tank into the respective inlet opening, through the pipe assembly, from the respective discharge opening, downwardly through said channel, and inwardly over said bottom; means to add liquid to be treated and any required chemical reagents to such flow, and means to withdraw treated liquid from the top of said chamber, whereby there can be established a flow, through said chamber, rising from said inward flow, between and then above said inwardly extending pipes; sludge outlet means in said bottom, within said chamber; sludge scraper means in said chamber, below said inwardly extending pipes, to scrape settled sludge to said sludge outlet means; and means to rotate said sludge scraper means.

6. A tank according to claim 5, additionally comprising an annular corner fill in the bottom part of said channel, exposing an inclined wall to the inside of the tank, which slopes from said side wall downward to a portion of said bottom just inside said ring of upwardly extending pipes.

7. A liquid treatment tank of the sludge blanket clarifier type, comprising a substantially flat, circular bottom; a side wall upstanding from a peripheral part of said bottom; a plurality of pipes upwardly extending from adjacent said bottom, inwardly spaced from said wall, uniformly spaced from one another, and forming an annular series of pipes, concentric with the tank; a further pipe connected to each of said upwardly extending pipes, below the top of the tank, inwardly extending into and ending in a central, lower part of the tank; means to hold said upwardly extending pipes together as a rigid structure; partition means secured to said upwardly extending pipes, extending from adjacent the top of the tank downwards to above said bottom, and defining an outer flocculation channel and an inner sludge filtration and clarification chamber; said partition means comprising plate members, each of which has one upright edge secured to that portion of the outside of an upwardly extending pipe which faces said side wall, and has the other upright edge secured to a portion of the outside of the next adjoining, upwardly extending pipe which is remote from said side wall; each of said inwardly extending pipes having an inlet opening in said central, lower part of the tank, and each of said upstanding pipes having a discharge opening in an upper part of said channel; fluid jet means to establish a liquid flow from said central, lower part of the tank into each of said inlet openings, from the respective discharge opening, downwardly through said channel, and inwardly over said bottom; means to add liquid to be treated and any required chemical reagents to such flow, and means to withdraw treated liquid from the top of said chamber, whereby there can be established a flow rising from said inward flow; sludge outlet means in said bottom, within said chamber; sludge scraper means in said chamber, to scrape settled sludge to said slude outlet means; and means to rotate said sludge scraper means.

8. A tank according to claim 7, wherein all of said discharge openings are located in lateral positions of the respective upwardly extending pipes which portions are disposed in the same direction with respect to said outer flocculation channel, so that said downward flow through said channel has a spiral direction.

9. A liquid treatment tank of the sludge blanket clarifier type, comprising a substantially flat, circular bottom; a side wall upstanding from a peripheral part of said bottom; an annular series of pipes concentric with the tank, upwardly extending from adjacent said bottom, inwardly spaced from said wall and uniformly spaced from one another; a further pipe connected to each of said upwardly extending pipes, between said bottom and the top of the tank, inwardly extending into a central, lower part of the tank, and forming a pipe assembly with the respective upwardly extending pipe; means to reinforce said pipe assemblies and to hold them together; a rigid structure upstanding from adjacent the inner ends of said inwardly extending pipes; a superstructure for said tank, supported by said side wall and said rigid structure; partition means secured to said upwardly extending pipes, extending from adjacent the top of the tank downwards to above said bottom, and defining an outer flocculation channel and an inner sludge filtration and clarification chamber; each of said inwardly extending pipes having an inlet opening in said central, lower part of the tank, and each of said upwardly extending pipes having a discharge opening in an upper part of said channel; means to establish a liquid flow from said central, lower part of the tank into each of said inlet openings, from the respective discharge opening, downwardly through said channel, and inwardly over said bottom; means to add liquid to be treated and any required chemical reagents to such flow, and means to withdraw treated liquid from the top of said chamber, whereby there can be established a flow rising from said inward flow, between and then above said inwardly extending pipes; sludge outlet means in said bottom, within said chamber; sludge scraper means in said chamber, below said inwardly extending pipes, to scrape settled sludge to said sludge outlet means; and means mounted on said superstructure to rotate said sludge scraper means.

10. A tank according to claim 9 wherein said rigid structure comprises a vertical, hollow cylinder, open at the bottom thereof and extending to the top of the tank, and wherein said means to add liquid to be treated discharges into said cylinder.

LAWRENCE W. BIEKER.
FRANK D. PRAGER.

REFERENCES CITED

The following references are of record in the file of this patent:

UNITED STATES PATENTS

| Number | Name | Date |
| --- | --- | --- |
| 2,143,750 | Darby et al. | Jan. 10, 1939 |
| 2,411,390 | Prager | Nov. 19, 1946 |
| 2,419,004 | Bieker et al. | Apr. 15, 1947 |
| 2,425,372 | Green | Aug. 12, 1947 |
| 2,427,092 | Kamp | Sept. 9, 1947 |